US011364651B2

(12) United States Patent
Hustveit et al.

(10) Patent No.: US 11,364,651 B2
(45) Date of Patent: Jun. 21, 2022

(54) HEATED TOOL FOR CUTTING AND SEALING MELTABLE MATERIAL

(71) Applicant: Esko-Graphics Kongsberg AS, Kongsberg (NO)

(72) Inventors: Sondre Hustveit, Kongsberg (NO); Simon Kvanvik, Oslo (NO); Lidvar Budal, Hønefoss (NO); Svein Erik Rasmussen, Lampeland (NO); Matti Damgaard Winther, Skollenborg (NO)

(73) Assignee: Kongsberg Precision Cutting Systems AS, Kongsberg (NO)

( * ) Notice: Subject to any disclaimer, the term of this patent is extended or adjusted under 35 U.S.C. 154(b) by 0 days.

(21) Appl. No.: 17/051,856

(22) PCT Filed: May 2, 2019

(86) PCT No.: PCT/EP2019/061276
§ 371 (c)(1),
(2) Date: Oct. 30, 2020

(87) PCT Pub. No.: WO2019/211390
PCT Pub. Date: Nov. 7, 2019

(65) Prior Publication Data

US 2021/0291399 A1 Sep. 23, 2021

Related U.S. Application Data

(60) Provisional application No. 62/666,449, filed on May 3, 2018.

(51) Int. Cl.
*B26F 3/10* (2006.01)
*B29C 65/00* (2006.01)

(52) U.S. Cl.
CPC .......... *B26F 3/10* (2013.01); *B29C 66/02241* (2013.01); *B29C 66/876* (2013.01)

(58) Field of Classification Search
CPC ...... B26F 3/10; B26F 3/08; B26F 3/06; B29C 66/02241; B29C 66/876
(Continued)

(56) References Cited

U.S. PATENT DOCUMENTS 3,083,757 A 4/1963 Kraft et al.
3,367,818 A 2/1968 Wasserstein
(Continued)

FOREIGN PATENT DOCUMENTS

DE 10027886 A1 12/2000
EP 0055211 A2 6/1982
(Continued)

OTHER PUBLICATIONS

International Preliminary Report on Patentability for International Application No. PCT/EP2019/061276, dated May 2, 2019, 10 pages.
(Continued)

*Primary Examiner* — Omar Flores Sanchez
(74) *Attorney, Agent, or Firm* — Murtha Cullina LLP

(57) ABSTRACT

A tool for cutting a substrate and method of use. The tool has a blade with a distal cutting tip at least one shoulder on one side of and proximal the cutting tip. The cutting tip and shoulder are positioned so that when cutting, at least a portion of the at least one shoulder is in contact with at least one cut edge of the substrate defined by a cut line formed by penetrating the substrate thickness with the cutting tip. A heater heats the blade shoulder to a temperature that causes the portion of the shoulder in contact with the cut edge of the substrate to seal the cut edge. The method includes heating the blade, penetrating the substrate with the cutting tip with a portion of the shoulder contacting the substrate, and moving the blade relative to the substrate.

27 Claims, 9 Drawing Sheets

(58) Field of Classification Search
USPC ........................................................ 83/16, 940
See application file for complete search history.

(56) References Cited

U.S. PATENT DOCUMENTS

| | | | |
|---|---|---|---|
| 3,692,613 | A | 9/1972 | Pederson |
| 4,000,029 | A | 12/1976 | Michaels |
| 4,352,703 | A | 10/1982 | Perron |
| 4,455,808 | A | 6/1984 | Netzhammer |
| 4,750,313 | A | 6/1988 | Kammler et al. |
| 4,856,259 | A | 8/1989 | Woo et al. |
| 4,994,137 | A | 2/1991 | Yanai |
| 5,056,295 | A | 10/1991 | Williams |
| 5,110,399 | A | 5/1992 | Yoshida et al. |
| 5,277,745 | A | 1/1994 | Williams |
| 5,358,592 | A | 10/1994 | Fukuyama |
| 5,403,427 | A | 4/1995 | Wilcox |
| 6,224,792 | B1 | 5/2001 | Janovec |
| 6,681,669 | B1 | 1/2004 | Bogan |
| 7,631,473 | B2 | 12/2009 | Nalle |
| 9,163,353 | B2 | 10/2015 | Lin |
| 2006/0060041 | A1 | 3/2006 | Nalle |
| 2006/0185797 | A1 | 8/2006 | Lauzon et al. |
| 2008/0000591 | A1 | 1/2008 | Basque |
| 2010/0171240 | A1 * | 7/2010 | Singh ................ B29C 66/73921 264/482 |

FOREIGN PATENT DOCUMENTS

| | | | |
|---|---|---|---|
| EP | 0106851 | A1 | 5/1984 |
| EP | 0370798 | A2 | 5/1990 |
| EP | 0400117 | A1 | 12/1990 |
| EP | 0754119 | A1 | 1/1997 |
| EP | 0768046 | A1 | 4/1997 |
| FR | 2396823 | A1 | 2/1979 |
| GB | 1504357 | | 3/1978 |
| WO | 9302246 | A1 | 2/1993 |

OTHER PUBLICATIONS

International Search Report and Written Opinion for International Application PCT/EP2019/061276, dated Jul. 16, 2019, 10 pages.

* cited by examiner

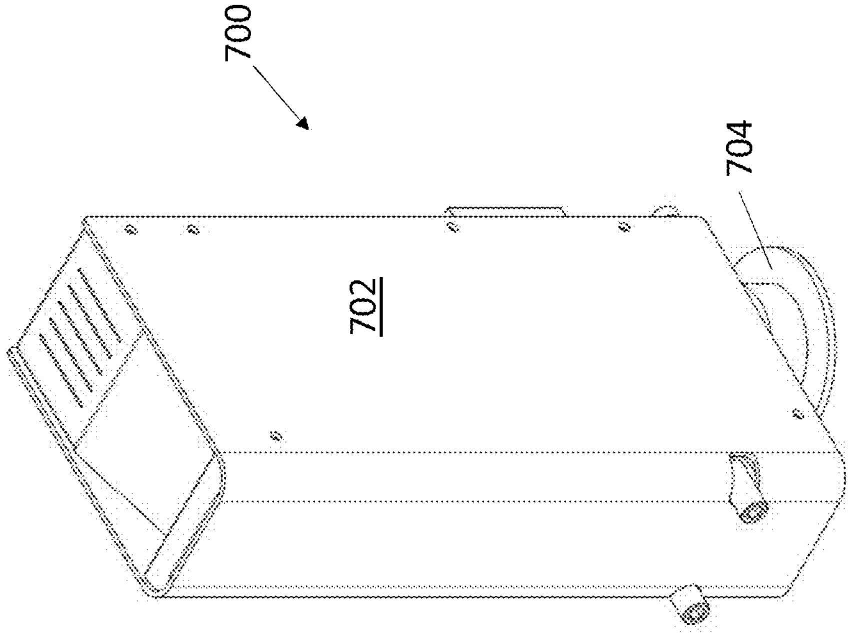
FIG. 6A
FIG. 5
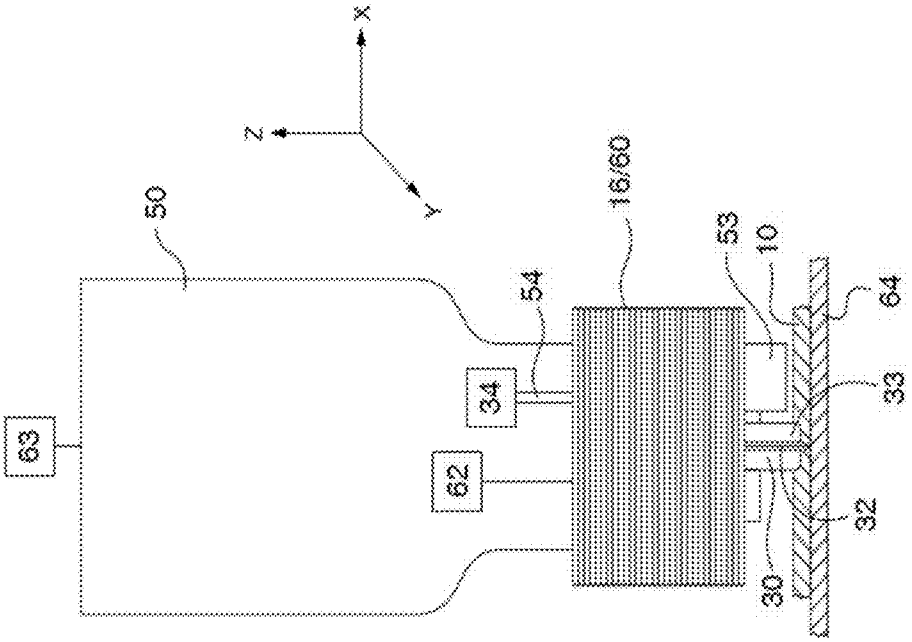

HEATED TOOL FOR CUTTING AND SEALING MELTABLE MATERIAL

CROSS-REFERENCE TO RELATED APPLICATIONS

This application is a National Phase of PCT Application Ser. No. PCT/EP2019/061276, filed May 2, 2019, which claims priority to U.S. Provisional Application Ser. No. 62/666,449, filed May 3, 2018, all titled the same as the present application, and all of the foregoing incorporated herein by reference in their entireties.

FIELD OF THE INVENTION

The present invention relates to the field of cutting and sealing sheets of meltable material.

BACKGROUND OF THE INVENTION

Tools for simultaneously cutting and sealing sheets of meltable material, such as synthetic substrates, are desirable to prevent a cut substrate from having loose edges as depicted in FIG. 6A. For example, carbon dioxide lasers are commonly employed for both cutting and sealing a sheet of synthetic material; however, carbon dioxide lasers are relatively expensive. Thus, there is a need in the art for a reliable, effective, and relatively lower cost tool for simultaneously cutting and sealing sheets of synthetic material.

SUMMARY

One aspect of the invention comprises a tool for cutting a substrate having a thickness and comprised of a material having a melt temperature. The tool comprises a blade having a cutting tip at a distal end of the blade and at least one shoulder disposed on one side of and proximal the cutting tip. The cutting tip and the shoulder are positioned such that at least a portion of the at least one shoulder is in contact with at least one cut edge of the substrate defined by a cut line formed by penetration of the substrate thickness with the cutting tip. A heater, such as an induction coil, is configured to heat the blade shoulder to a temperature selected relative to the substrate material melt temperature to cause the portion of the shoulder in contact with the cut edge of the substrate to seal the cut edge.

In one embodiment, the blade is a rotary blade with the cutting tip spaced a first radial distance from an axis of rotation of the rotary blade, and the at least one shoulder has a periphery extending no greater than a second radial distance from the axis of rotation, wherein the second distance is less than the first distance. A motor and transmission system are configured to rotate the rotary blade. The cutting tip and shoulder(s) may be separate components mounted to a shaft. The tool may have means for rotating the tool head on an axis perpendicular to the axis of rotation of the rotary blade, such as to angle the blade so that the radius of the blade is parallel to the direction of relative blade travel.

The blade may have a pair of shoulders disposed on opposite sides of the cutting tip. The heater may comprise an induction coil that at least partially surrounds a portion of the blade. The cutting tip may be faceted, such that it includes a perimeter and a plurality of sharp cutting points disposed along the perimeter. A hold down foot having an opening sized to fit the blade and the at least one shoulder may be configured to apply downward pressure on the substrate.

A motion system may be configured to impart relative motion between the blade and the substrate, such as a gantry system, a positioning table, a linear positioning stage or slide. In one embodiment, the motion system may comprise a gantry system of a converting table or cutting table, sometimes also referred to as a finishing table, and the tool may be one of a plurality of interchangeable tools configured for use on the finishing table. The tool may have a fume disposal system, comprising a vacuum system configured to create a source of vacuum, and a conduit system connecting the vacuum source to an opening adjacent the blade.

Another aspect of the invention comprises a method for cutting a substrate comprised of a material having a melt temperature. The method comprises providing a blade comprising a cutting tip at an outer perimeter of the blade, and at least one shoulder disposed on at least one side of and proximal the cutting tip. The method comprises heating the blade, such as with an induction coil, to a predefined temperature and penetrating the substrate with the cutting tip such that a portion of the shoulder is in contact with the substrate while imparting relative motion between the blade and the substrate along a cut line to create a cut edge. The predefined temperature is selected relative to the melt temperature of the substrate to cause the portion of the shoulder in contact with the cut edge of the substrate to seal the cut edge.

The blade may be a rotary blade. The blade may have a pair of shoulders disposed on opposite sides of the cutting tip, in which case the method comprises sealing opposing cut edges of the substrate defined on either side of the cut line. The method may further comprise moving the blade relative to a stationary substrate, such as with a gantry system. The blade may be mounted on a tool head, with the method further comprising angling the tool head so that a radius or width of the blade runs parallel to a direction of relative blade travel. The blade may comprise an interchangeable tool of a finishing table, in which case the method may comprise installing the interchangeable tool on the finishing table prior to cutting and sealing the substrate, removing the interchangeable tool after cutting and sealing the substrate using the finishing table, or a combination thereof.

BRIEF DESCRIPTION OF THE DRAWINGS

FIG. 5 is a schematic elevation view of the device of FIG. 4 for cutting and sealing a substrate.

FIG. 6A is a schematic isometric illustration depicting an exemplary tool, showing its housing.

DETAILED DESCRIPTION OF THE INVENTION

Figure 1C:
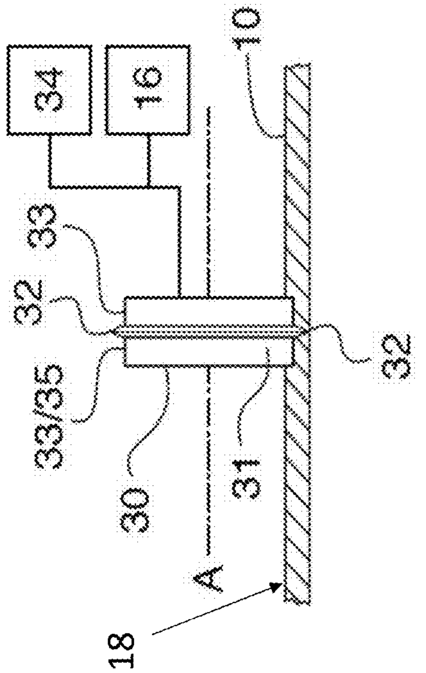
FIG. 1C is a schematic elevation view of a tool for cutting and sealing a substrate, according to a third exemplary embodiment.

Although the invention is illustrated and described herein with reference to specific embodiments, the invention is not intended to be limited to the details shown. Rather, various modifications may be made in the details within the scope and range of equivalents of the claims and without departing from the invention.

Corresponding reference characters indicate corresponding parts throughout the several views.

Figure 1A:
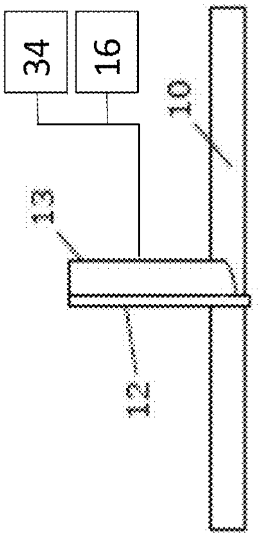
FIG. 1A is a schematic elevation view of a tool for cutting and sealing a substrate, according to a first exemplary embodiment.
Figure 1B:
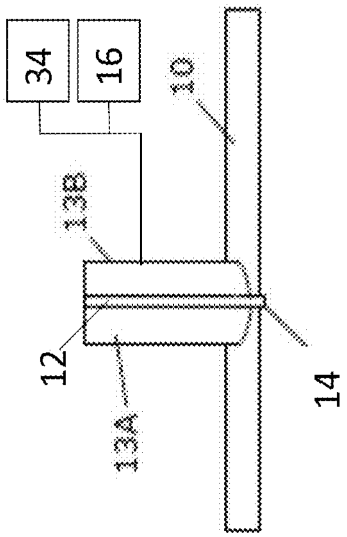
FIG. 1B is a schematic elevation view of a system for cutting and sealing a substrate, according to a second exemplary embodiment.
Figures 7A, 7B:
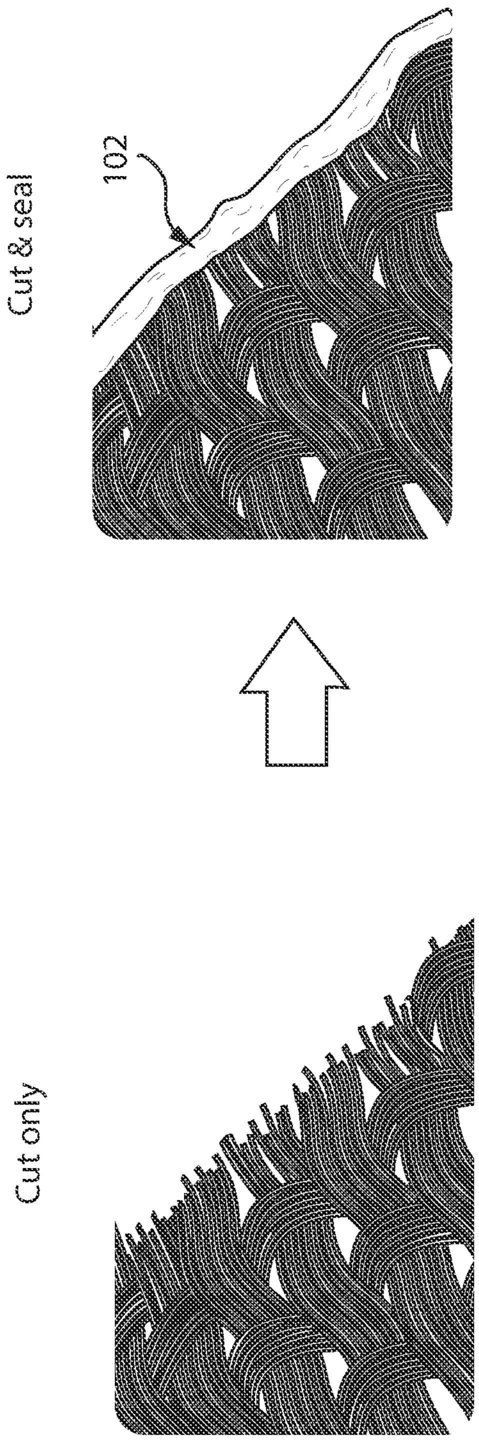
FIGS. 7A and 7B are photographs showing a cut edge and a cut and sealed edges, respectively, of a substrate.
Figure 7C:
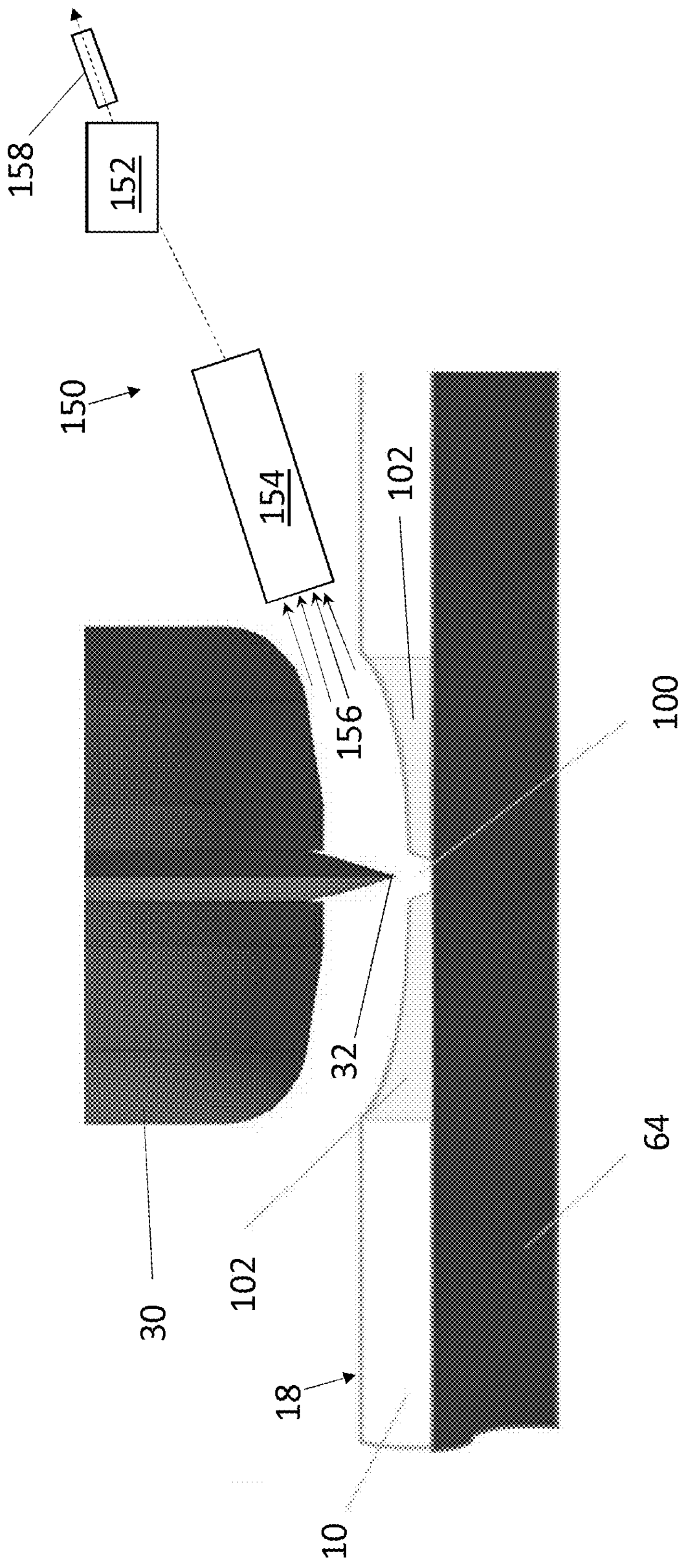
FIG. 7C is a schematic illustration showing a front view of a blade cutting a substrate.

Referring now to the figures, FIGS. 1A-1C depict three different tool arrangements for cutting and sealing a substrate 10 to produce a cut and sealed edge, such as the edge shown in FIGS. 7B and 7C.

FIGS. 1A and 1B are schematic elevation views of tools comprising a blade 12 for cutting and sealing a substrate 10, according to a first exemplary embodiment. The blade 12, which is shown schematically, is a heated knife or knife blade having a cutting tip 14 for cutting the substrate 10 and one (as depicted in FIG. 1A) or more (as depicted in FIG. 1B) shoulders 13 adjacent the cutting tip 14. The substrate 10 may be a polymeric material, for example, such as vinyl or nylon, and may comprise a textile, such as substrate comprising synthetic materials in a woven or knit pattern. The blade 12 is heated by a heater 16. By way of non-limiting example, the heater 16 may be an induction heater, a conduction heating element, a convection heater, a radiating heater, a heating element, a hot air gun, or a resistance heating element, such as typically found in a pyrography pen.

In use, the blade 12 is moved relative to the surface 18 of the substrate 10 along a cut line. The blade 12 may be moved either manually or automatically relative to the substrate 10. Alternatively, the substrate 10 may be moved either manually or automatically relative to the blade 12. As the blade 12 moves with respect to the substrate 10, the cutting tip 14 of the blade 12 cuts through the substrate 10. The high temperature of the blade 12 cuts the substrate 10, while the one or more shoulders 13 simultaneously melts and seals the substrate along the cut edge. The temperature of the blade 13 is selected to be greater than the melt temperature of the substrate 10 such that the shoulder(s) 13 melts the cut edge(s), thereby sealing them.

Figure 3:
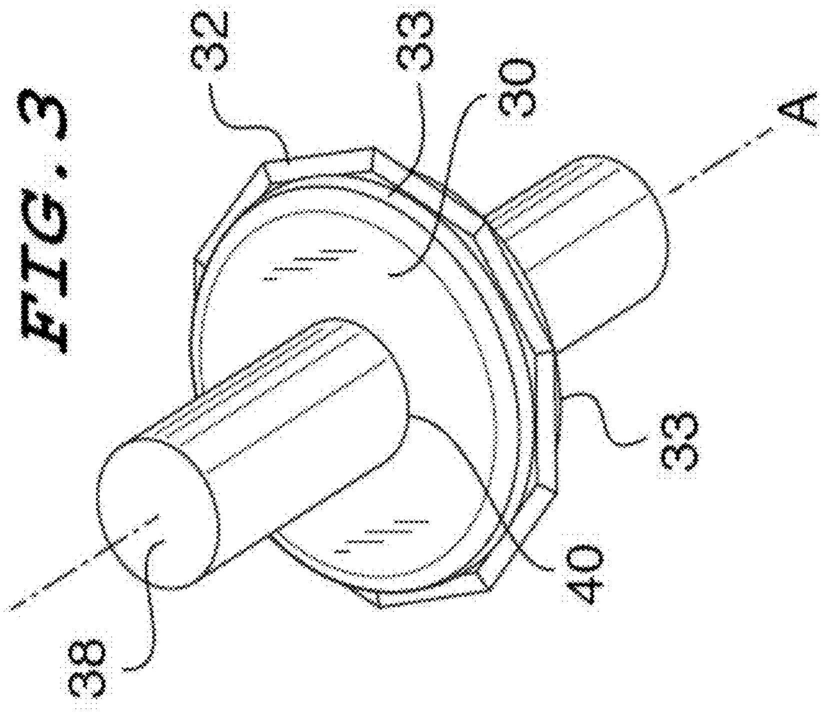
FIG. 3 is a schematic isometric view of the blade of FIG. 2 shown positioned on a shaft.
Figure 2:
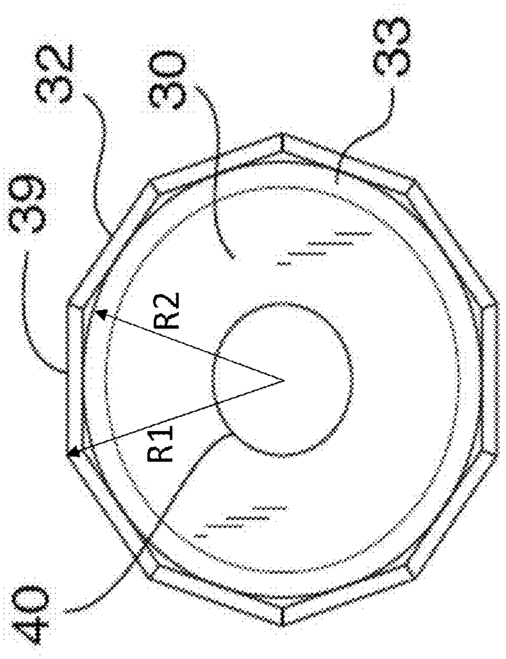
FIG. 2 is a schematic isometric view of the blade of FIG. 1C.

FIG. 1C and FIG. 7C are schematic elevation views of another tool in the form of a rotary blade 30 for cutting and sealing the substrate 10, according to a third exemplary embodiment. FIGS. 2 and 3 depict a schematic isometric view of the rotary blade 30 of FIG. 1C and FIG. 7C. The rotary blade 30 comprises a substantially cylindrical body 31 having an exterior revolved surface 35. The exterior revolved surface 35 includes a cutting tip 32 that extends radially outward (i.e. away from axis A) from a pair of shoulders 33 on opposite sides of the cutting tip. Although shown with two shoulders, it should be understood that the rotary blade may have only a single shoulder. The cutting tip 32 may be centered axially between the shoulders.

The cutting tip 32 and the shoulders 33 may be integral with the body 31, or, alternatively, the cutting tip 32 and each of the shoulders may comprise separate components mounted on a shaft 38 (as depicted in FIG. 3). The cutting tip 32 may have a circular perimeter or it may be faceted, thereby comprising a polygonal perimeter having interconnected straight portions 39 that interconnect at sharp cutting points (e.g., a hexagon, a decagon (as shown), or a polygon having any number of sides). The cutting tip and the shoulders may comprise the same materials of construction, or the cutting tip may comprise a different material of construction from the shoulders.

Although shown in FIGS. 1A-1C and 7C with shoulders that are slightly rounded or angled or relatively flat, when viewed in cross section or from the views depicted therein, each shoulder or both shoulders may have any contour desired, including a different contour on each shoulder. Thus, the pair of shoulders 33 formed on opposing sides of the cutting tip 32 may have a cross-sectional geometry that is angled, rounded, flat, parabolic, or contoured, for example. The cutting tip 32 is spaced a first radial distance R1 from an axis of rotation A of the rotatable blade 30 and the shoulders 33 have a periphery extending no greater than a second radial distance R2 from the axis of rotation A. The second distance R2 is less than the first distance R1.

Figure 4:
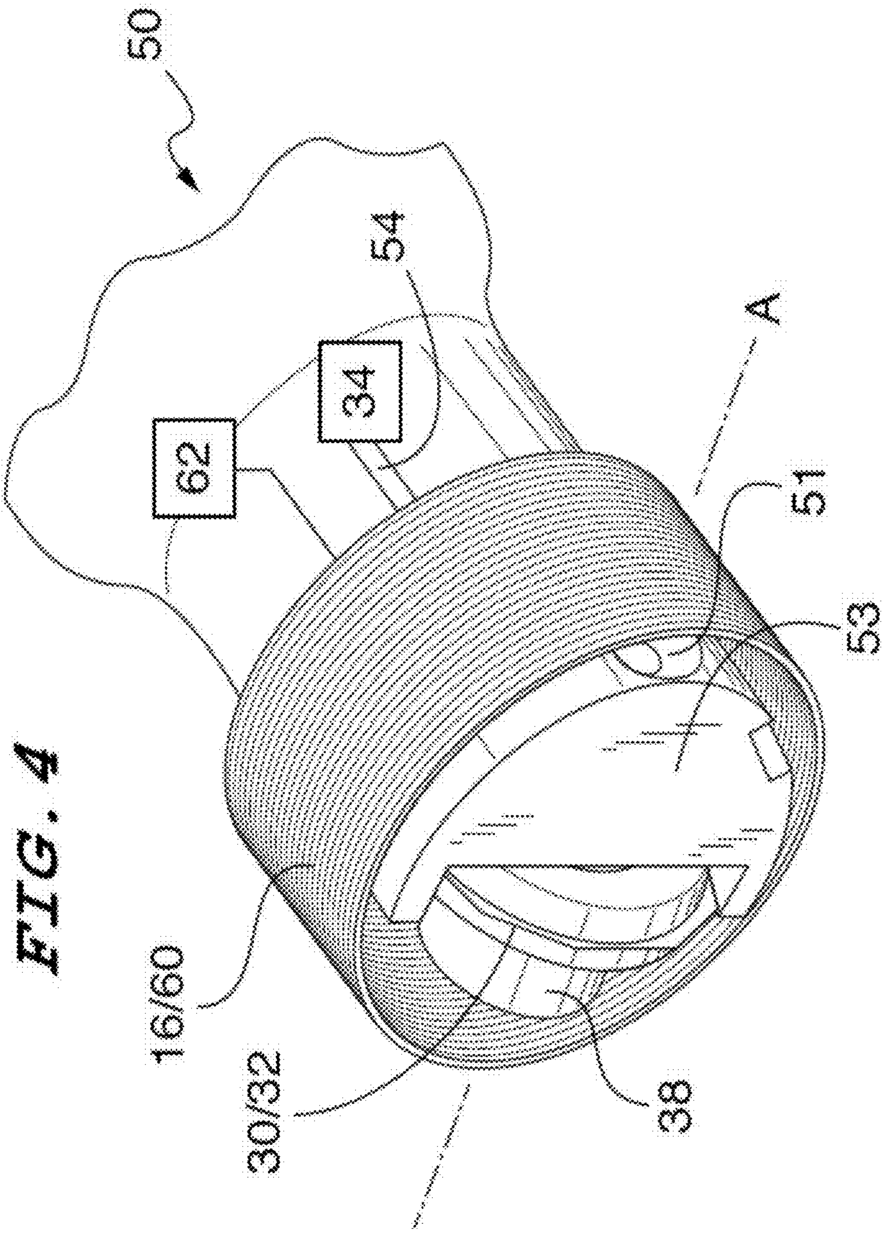
FIG. 4 is a schematic isometric view of a device for cutting and sealing a substrate including the tool of FIG. 3.

The body 31 and the cutting tip 32 are formed from a heat conducting material, such as aluminum or steel, for example. Referring now to FIG. 4, the rotary blade 30, preferably a faceted blade, is heated by a heater 16, depicted as an inductive heating coil, and may be rotated about axis A by a motor 34 and a connected transmission system (depicted in more detail in FIGS. 6B and 6C. The motor (and gearing or other transmission system for transmitting motion from the motor to motion of the rotary blade) may comprise any such system known in the art, such as the system commercially used in connection for rotating the blade of an Esko Kongsberg™ RotaCut™ tool, incorporated herein by reference, and depicted schematically in FIGS. 6A-6E. Some embodiments of the cutting tool 700 may have a “floating foot” 704 for holding down the substrate during the cutting and sealing step, the foot having a periphery that surrounds the blade with a slot wide enough to permit the cutting tip and shoulder(s) to protrude. Sufficient clearance between the edges of the slot and the shoulder(s) is provided and the materials of construction for the foot are selected to minimize heat absorbed by the foot, dissipate any heat so absorbed, and/or otherwise ensure the foot does not accumulate enough heat to melt the substrate or the foot. Hold down foot 704 comprises a spring 708 configured to bias the foot in a downward direction to hold down the substrate. The foot may be connected to the tool in any manner known in the art and the foot may conform to any design known in the art, including but not limited to the design currently employed in the Kongsberg™ RotaCut™ tool, with appropriate modification to provide clearance for the blade shoulders and a heat resistant construction.

In use, the heater 16 heats the rotary blade 30 while the motor 34 rotates the rotary blade 30 about the axis A. The temperature of the rotary blade 30 is selected to be greater than the melt temperature of the substrate 10. The rotary blade 30 is applied to the top surface 18 of the substrate 10. As the rotary blade 30 moves along the surface 18, the heated cutting tip 32 of the rotary blade 30 cuts through the substrate 10. The high temperature of the rotary blade 30 simultaneously seals the cut edges of the substrate 10 to form one or more sealed edges 102 adjacent the cut line 100, as depicted in FIG. 7C.

FIG. 3 is a schematic isometric view of the rotary blade 30 of FIG. 2 shown with a cylindrical shaft 38 positioned through a center hole 40 of the rotary blade 30. The center hole 40 defines the axis of rotation A of the rotary blade 30. The shaft 38 may be keyed in the hole 40 (i.e., non-rotatable with respect to the hole 40) such that rotation of the post 38 causes rotation of the rotary blade 30. Rotary blade may comprise separate shoulder 33 and cutting tip 32 components assembled together on the shaft, or an integral unit comprising the cutting tip 32 and one or two shoulders 33. For embodiments in which the shape or offset of the shoulder relative to the blade tip (R2−R1) is variable, or for other reasons to vary the number of shoulders, size or materials of the blade or shoulders, or to account for wear, a plurality of different size/shape/materials shoulders and cutting tips may be interchangeably provided for placement on the shaft. Or, in other embodiments, entire blades (including the cutting tip and one or more shoulders) may be interchangeable as a unit. The interchangeable parts may be secured to the shaft with set screws or with compression fittings that sandwich the parts together, or by any means known in the art for securing objects to a shaft.

FIG. 4 is a schematic isometric view of a device 50 for cutting and sealing a substrate including the rotary blade 30 of FIG. 3. The shaft 38 of the rotary blade 30 is rotatably and removably attached to the motor 34 and transmission *54n* opening 51 in a tool head 53 of the device 50. The motor 34 and a transmission 54 (shown schematically in FIG. 4 and in more detail in FIGS. 6C and 6D) are mounted within the device 50 (e.g. inside housing 702 of tool 700). The motor 34 is configured to drive the transmission 54 configured to drive (i.e., rotate) the shaft 38 and the entire rotary blade 30 at a desired speed. The heater 16, in the form of an induction coil 60, is mounted over the tool head 53 of the device 50 and connected to a power source (not shown). The induction coil 60 may comprise a Litz cable composed of copper clad aluminum. A circuit 62 is connected to the induction coil 60 for controlling the coil 60. Circuit 62 may be controlled by a processor or collection of integrated circuits 708, depicted generally in an exemplary location in FIG. 6B. In the exemplary location shown, the integrated circuits may be covered by a ventilated cover (not shown) attached to housing 702, and in view of the proximity to the induction coil, the cover may comprise insulation that provides heat and/or EMF protection. The circuitry may also be actively ventilated by a fan drawing cool air from a location distant from the heated knife.

The induction circuit 62 is configured to supply high frequency AC current to the induction coil 60, which causes an alternating flux about the coil 60, which causes Eddy currents about the blade 30 due to an induced electromagnetic field. The blade 30 is composed of a conductive material. The Eddy currents generate heat in the blade 30, thereby causing the temperature of the blade 30 to increase. The degree of induction heating of the blade 30 is closely controlled by circuit 62. Although not shown, the device 50 may include a digital or analog control, which may also include a display, for setting the temperature of the blade 30.

Figure 8:
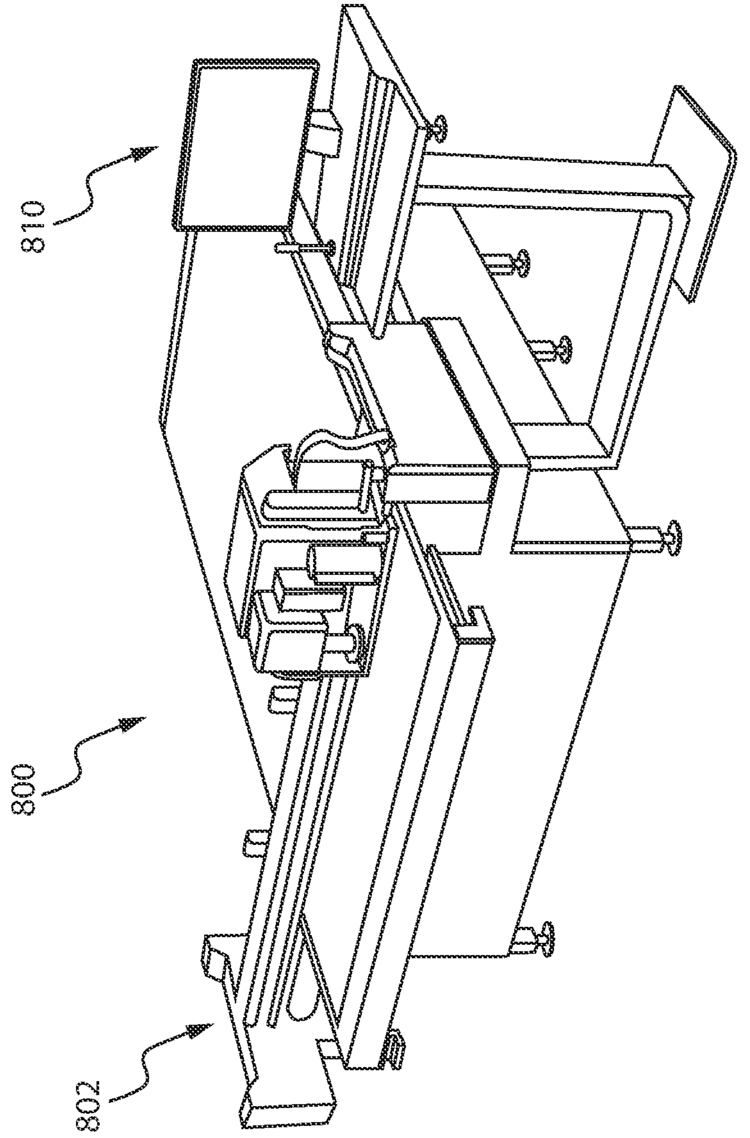
FIG. 8 is a photograph of an exemplary finishing machine.

FIG. 5 is a schematic elevation view of the device 50 of FIG. 4 for cutting and sealing the substrate 10. The substrate 10 is positioned above an underlay 64, which may be composed of silicon or felt, for example. The device 50 and/or the substrate 10 is/are connected to a motion system 63 for moving the device 50 relative to the substrate 10 (or vice versa). For example, system 63 may comprise a table 800, such as is depicted in FIG. 8, configured to translate the substrate along X, Y, and/or Z axis, or the table may have a carriage or gantry system 802 configured to position device 50 along X, Y and/or Z axes. The motion system 63 may comprise a motorized positioning table, gantry, linear positioning stage or a slide having a ball screw, motor shaft, belt or other mechanized device for causing translational movement. An exemplary system may be implemented on a finishing table, such as but not limited to a Kongsberg X Series or C Series finishing table, made by Esko Graphics Kongsberg AS, and having interchangeable tools, as are known in the art, in which the motion system comprises a computer controlled gantry system. Thus, one method of using the system as described herein includes installing the blade on the finishing table prior to cutting and sealing the substrate, removing the blade after cutting and sealing the substrate, or a combination thereof, where steps are performed by tools other than the cutting and sealing blade before or after the cut and seal step. The invention is not limited to any particular system for moving the blade over the substrate, and may include a freestanding blade without a motion system.

Figure 6B:
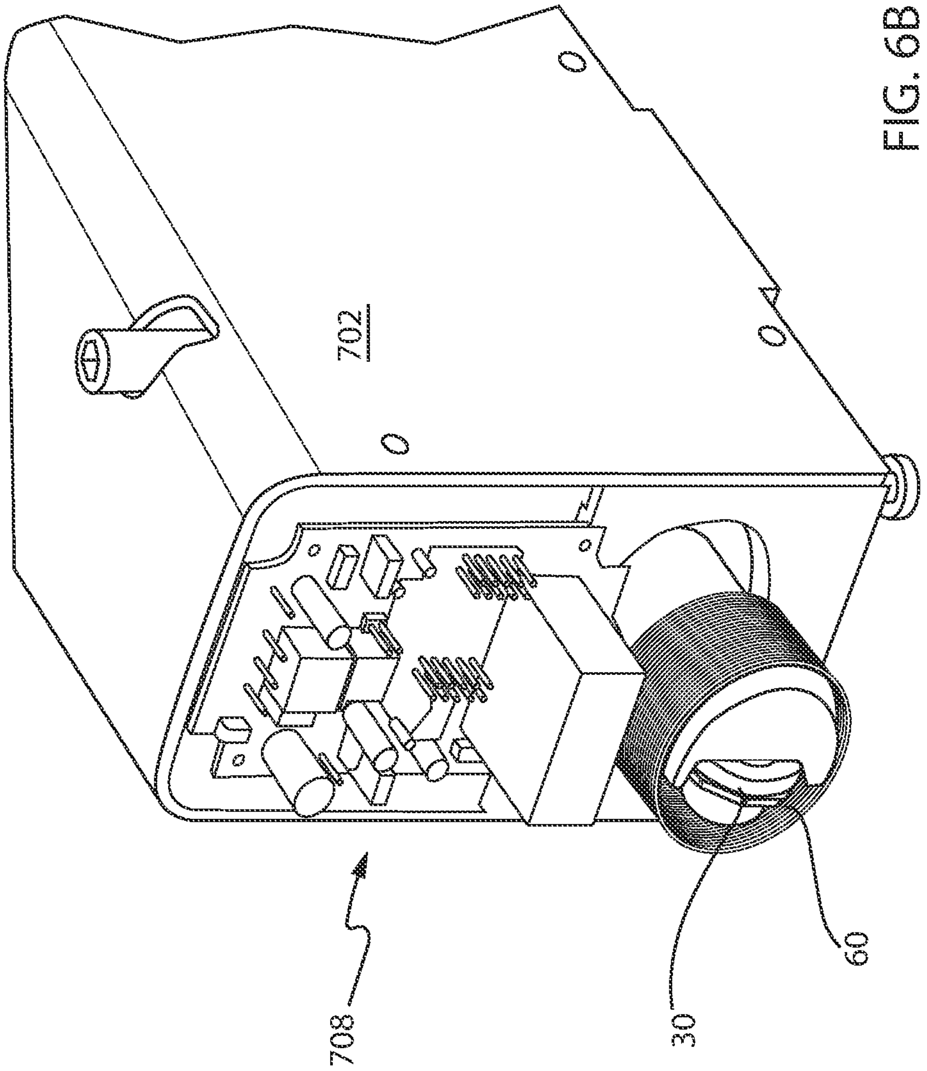
FIG. 6B is a schematic isometric illustration depicting an underside of the exemplary tool of FIG. 6A.
Figure 6D:
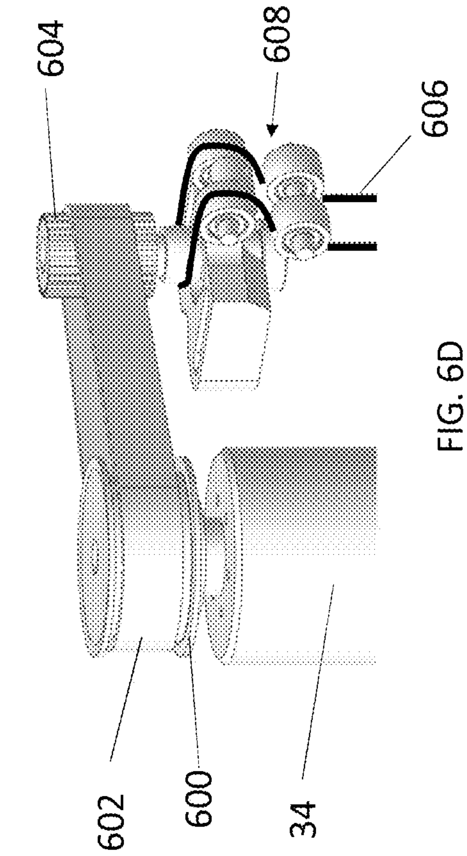
FIG. 6D is a schematic isometric more detailed illustration of a portion of the inner workings of the tool depicted in FIG. 6C.
Figure 6E:
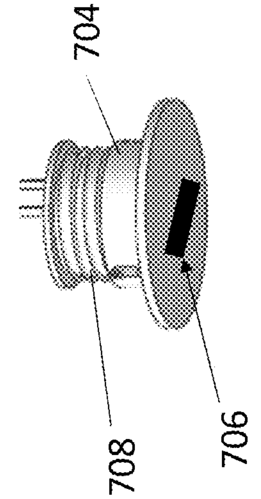
FIG. 6E is a schematic isometric drawing of the floating hold down foot of the tool depicted in FIG. 6A.
Figure 6C:
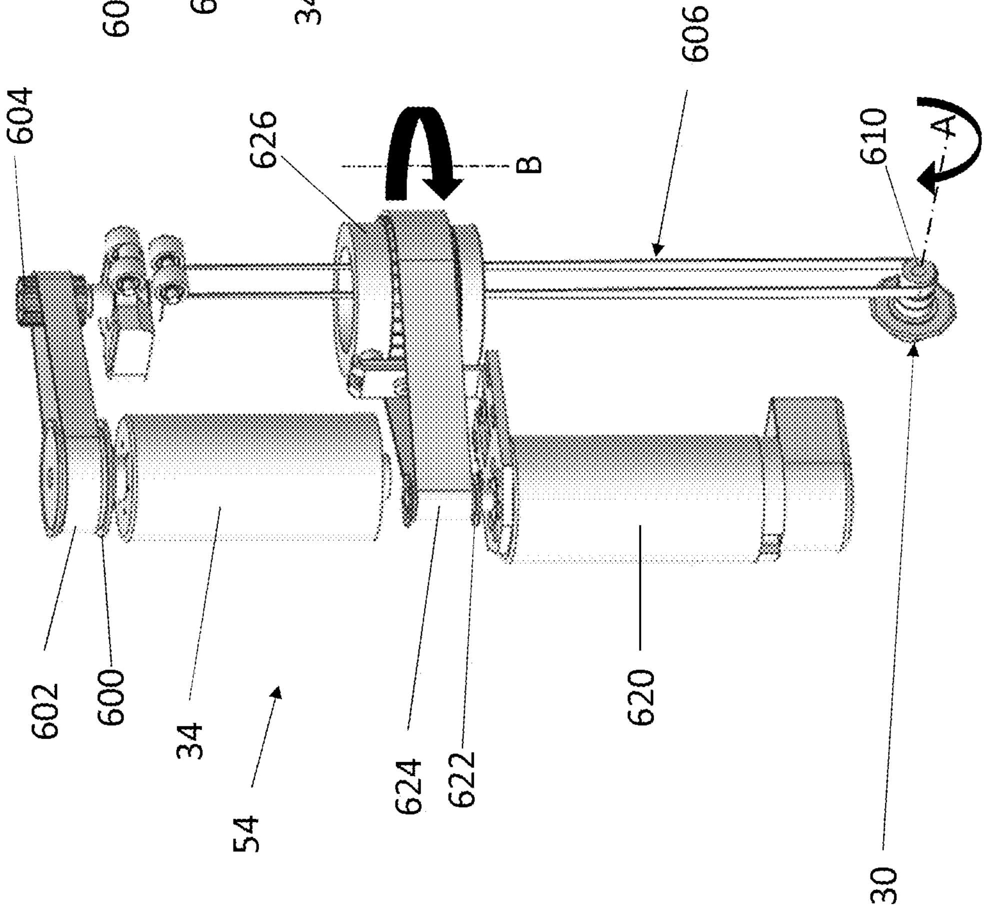
FIG. 6C is a schematic isometric illustration depicting exemplary portions of the inner workings of the tool of FIG. 6A.

The transmission system 54 for rotating the blade is shown in more detail in FIGS. 6B and 6C. Motor 34 turns first pulley 600 outfitted with a timing belt 602 that turns a second pulley 604. Second pulley 604 drives blade drive belt 606, which extends through a set of tensioning rollers 608 to a blade shaft driver pulley 610. Blade drive belt is preferably a heat resistant belt, chain or wire from a material selected to withstand the temperatures of the blade and inductive heater. A cooling system (not shown), such as one or more fans, may be provided to minimize overall temperature in the tool, and in particular to minimize any heating caused by heat transfer by the blade drive belt to other components. The shaft 38 of blade 30 interfaces with the blade shaft driver pulley 610 so that rotation of the blade shaft driver pulley rotates the shaft about axis A, which rotates the blade. As part of the motion system 63, the tool head 53 is preferably rotatable to angle the tool head on axis B in the XY plane so that the blade radius is parallel to the direction of tool travel. The rotation system comprises a head rotation motor (with encoder) 620, a first head rotation pulley 622, a timing belt 624, and a second head rotation pulley 626. The systems depicted in FIGS. 6C and 6D are housed inside housing 702 of tool 700.

In operation, using the temperature controller on the device 50, which may be via a computer system with a display associated with the finishing table (such as the display 810 depicted in FIG. 8), the temperature of the blade 30 is set to a value that is greater than the melting temperature of the substrate 10. The motor 34 for driving the blade is then activated. The speed of the motor 34 may also be variable and set to a pre-determined value using the display. The motion system 63 then translates device 50 relative to the substrate 10. The cutting tip 32 of the rotating blade 30 is moved along the Z axis and into the thickness dimension of the substrate 10. The rotating blade 30 simultaneously cuts and seals the cut ends of the substrate 10. Specifically, the cutting tip 32 of the blade 30 cuts into the substrate 10, while the heated shoulders 33 of the blade 30 seal the cut edges of the substrate 10. The motion system 63 moves device 50 along the X and/or Y axes along a cut/seal path while the heated blade 30 cuts and seals the substrate 10. The motion system 63 may be programmed to move the blade 30 in a pre-determined path along the substrate 10.

According to another exemplary embodiment of the invention, rather than a rotatable blade 30, a blade that does not rotate may be provided along with a motion system, such as a finishing table with a gantry system, configured to move and angle the linear blade along a cut/seal path relative to the substrate.

Embodiments of the invention may also include a vacuum system 150 mounted near the blade for disposing of fumes caused by melting of the substrate. Such vacuum disposal systems may be particularly useful for use in closed environments with substrates that create toxic fumes when melting. A suitable vacuum disposal system comprises a source of vacuum 152, a hose or pipe 154 mounted sufficiently close to the blade and having a diameter suitable to pull a sufficient volume of air 156 into the hose or pipe to capture the fumes desired to be captured. The vacuum system may comprise a filter 158, such as a charcoal filter, for neutralizing the fumes before discharge into the atmosphere. The discharge may be located on the finishing machine for a local source of vacuum, or the vacuum may be provided by a facility wide vacuum system, in which case the finishing machine comprises a coupling for hooking up the vacuum system to the machine, and flexible tubing to convey the vacuum from the opening by the blade back to the connection to the vacuum system.

Although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A tool for cutting a substrate comprised of a material having a melt temperature, the tool comprising:

a blade comprising a cutting tip at a distal end of the blade and at least one shoulder disposed on one side of and proximal the cutting tip, the cutting tip and the at least one shoulder positioned relative to one another such that with the blade positioned relative to the substrate with the cutting tip penetrating a thickness of the subsrate, at least a portion of the at least one shoulder is in contact with at least one cut edge of the substrate created by the penetrating of the thickness by the cutting tip; and an induction coil configured to heat the at least one shoulder to a temperature selected relative to the melt temperature to cause the portion of the at least one shoulder in contact with the cut edge of the substrate to seal the cut edge.

2. The tool of claim 1, wherein the blade is a rotary blade, the cutting tip is spaced a first radial distance from an axis of rotation of the rotary blade, and the at least one shoulder has a periphery extending no greater than a second radial distance from the axis of rotation, wherein the second radial distance is less than the first radial distance.

3. The tool of claim 1, wherein the blade is a rotary blade mounted on a tool head, and the tool further comprises a motor and transmission system configured to rotate the rotary blade.

4. The tool of claim 3, further comprising means for rotating the tool head on an axis perpendicular to an axis of rotation of the rotary blade.

5. The tool of claim 1, wherein the at least one shoulder comprises a pair of shoulders disposed on opposite sides of the cutting tip.

6. The tool of claim 1, wherein the induction coil at least partially surrounds a portion of the blade.

7. The tool of claim 1, wherein the cutting tip and the at least one shoulder are separate components mounted to a shaft.

8. The tool of claim 1, wherein the cutting tip is a rotary knife blade formed as a regualr polygon.

9. The tool of claim 1, further comprising a motion system configured to impart relative motion between the blade and the substrate to cut and seal the substrate along a predetermined cut path.

10. The tool of claim 9, wherein the motion system is a motorized system comprising a gantry, a positioning table, a linear positioning stage or a slide.

11. The tool of claim 10, wherein the motion system comprises a gantry system of a finishing table.

12. The tool of claim 11, wherein the tool is one of a plurality of interchangeable tools configured for use on the finishing table.

13. The tool of claim 1, further comprising a foot configured to apply downward pressure on the substrate, the foot having an opening sized to fit the blade and the at least one shoulder.

14. The tool of claim 1, further comprising a fume disposal system comprising a vacuum system configured to create a source of vacuum, and a conduit system connecting the vacuum source to an opening adjacent the blade.

15. A method for cutting a substrate comprised of a material having a melt temperature, the method comprising:

providing a tool comprising:

a blade comprising a cutting tip at a distal end of the blade and at least one shoulder disposed on one side of and proximal the cutting tip, the cutting tip and the at least one shoulder positioned relative to one another such that with the blade positioned relative to the substrate with the cutting tip pentrating a thickness of the substrate, at least a portion of the at least one shoulder is in contact with at least one cut edge of the substrate created by the penetrating of the thickness by the cutting tip; and an induction coil configured to heat the at least one shoulder to a temperature selected relative to the mely temperature to cause the portion of the at least one shoulder in contact with the cut edge of the substrate to seal the cut edge;

heating the blade, using the induction coil, to the selected temperature;

penetrating the substrate with the cutting tip such that the portion of the at least one shoulder is in contact with the substrate;

imparting relative motion between the blade and the substrate; and sealing the cut edge of the substrate with the at least one shoulder along a cut line defined by the relative motion.

16. The method of claim 15, wherein the blade is a rotary blade, the cutting tip is spaced a first radial distance from an axis of rotation of the rotary blade, and the at least one shoulder has a periphery extending no greater than a second radial distance from the axis of rotation, wherein the second radial distance is less than the first radial distance.

17. The method of claim 15, further comprising imparting rotation to the rotary blade.

18. The method of claim 15, wherein the at least one shoulder comprises a pair of shoulders disposed on opposite sides of the cutting tip, and the method further comprises sealing opposing cut edges of the substrate defined on either side of the cut line.

19. The method of claim 15, further comprising moving the blade relative to the substrate, which is stationary.

20. The method of claim 19, further comprising moving the blade using a gantry system.

21. The method of claim 15, wherein the blade is mounted on a tool head, the method further comprising angling the tool head so that a radius or width of the blade runs parallel to a direction of relative blade travel.

22. The method of claim 15, wherein the blade comprises an interchangeable tool of a finishing table, and the method further comprises installing the interchangeable tool on the finishing table prior to cutting and sealing the substrate, removing the interchangeable tool after cutting and sealing the substrate using the finishing table, or a combination thereof.

23. The method of claim 15, further comprising applying downward pressure on the substrate in a region of the substrate adjacent the blade and the at least one shoulder while cutting the substrate with the tool.

24. The method of claim 15, further comprising providing an underlay beneath the substrate when cutting the substrate with the tool, wherein the underlay is completed of silicon or felt.

25. The method of claim 15, further comprising collecting fumes from adjacent the blade into a conduit connected to a vacuum source.

26. The method of claim 25, further comprising processing the fumes in a fume disposal system, which includes the conduit and the vacuum source.

27. A tool for cutting a substrate comprised of a material having a melt temperature, the tool comprising:

a rotary blade comprising a cutting tip at a distal end of the rotary blade and at least one shoulder disposed on one side of and proximal the cutting tip, the cutting tip and the at least one shoulder positioned relative to one another such that with the rotary blade positioned relative to the substrate with the cutting tip penetrating a thickness of the substrate, at least a portion of the at least one shoulder is in contact with at least one cut edge of the substrate created by the penetrating of the thickness by the cutting tip, the rotary blade being mounted on a tool head;

a motor and transmission system configured to rotate the rotary blade;

means for rotating the tool head on an axis perpendicular to an axis of rotation of the rotary blade; and a heater configured to heat the at least one shoulder to a temperature selected relative to the melt temperature to cause the portion of the at least one shoulder in contact with the cut edge of the substrate to seal the cut edge.

* * * * *

UNITED STATES PATENT AND TRADEMARK OFFICE

CERTIFICATE OF CORRECTION

PATENT NO. : 11,364,651 B2
APPLICATION NO. : 17/051856
DATED : June 21, 2022
INVENTOR(S) : Sondre Hustveit et al.

It is certified that error appears in the above-identified patent and that said Letters Patent is hereby corrected as shown below:

In the Claims

Claim 15
Column 8, Line 41: Before "temperature to cause", please delete "mely" and insert --melt--.

Claim 24
Column 9, Line 20: After "underlay is", please delete "completed" and insert --composed--.

Signed and Sealed this
Sixth Day of September, 2022

Katherine Kelly Vidal

Katherine Kelly Vidal
*Director of the United States Patent and Trademark Office*